(12) United States Patent
Wood

(10) Patent No.: US 8,783,767 B2
(45) Date of Patent: Jul. 22, 2014

(54) HEADREST MEDIA SYSTEM FOR A SEAT BACK OF A VEHICLE

(76) Inventor: David Wood, Orlando, FL (US)

( * ) Notice: Subject to any disclaimer, the term of this patent is extended or adjusted under 35 U.S.C. 154(b) by 389 days.

(21) Appl. No.: 13/102,342

(22) Filed: May 6, 2011

(65) Prior Publication Data

US 2012/0280542 A1   Nov. 8, 2012

(51) Int. Cl.
*A47C 7/72* (2006.01)
*A47C 7/74* (2006.01)
*B60N 2/48* (2006.01)
*B60R 11/00* (2006.01)

(52) U.S. Cl.
CPC ............... *B60N 2/4876* (2013.01); *A47C 7/72* (2013.01); *B60R 2011/0017* (2013.01)
USPC .................................................. 297/217.4

(58) Field of Classification Search
CPC ............ A47C 7/72; B60N 2/4876; B60R 2011/0015; B60R 2011/0017; B60R 11/0235
USPC ............ 297/217.3, 217.4, 463.2, 391, 217.1, 297/180.1; 348/837
See application file for complete search history.

(56) References Cited

U.S. PATENT DOCUMENTS

| | | | |
|---|---|---|---|
| RE33,423 E * | 11/1990 | Lobanoff | 297/188.06 |
| 5,842,715 A * | 12/1998 | Jones | 280/727 |
| 6,124,902 A | 9/2000 | Rosen | |
| 6,669,285 B1 | 12/2003 | Park | |
| 7,218,360 B2 * | 5/2007 | Schedivy | 348/838 |
| 7,360,833 B2 | 4/2008 | Vitito | |
| 7,591,508 B2 | 9/2009 | Chang | |
| 7,597,393 B1 * | 10/2009 | Tuccinardi et al. | 297/217.3 |
| 7,679,578 B2 | 3/2010 | Schedivy | |
| 7,758,117 B2 | 7/2010 | Chang | |
| 7,780,231 B2 | 8/2010 | Shalam | |
| 7,791,586 B2 | 9/2010 | Shalom | |
| 7,909,397 B2 * | 3/2011 | Shalam et al. | 297/217.3 |
| 7,954,894 B2 * | 6/2011 | Schedivy et al. | 297/217.3 |
| 8,141,948 B2 * | 3/2012 | Cassellia et al. | 297/217.3 |
| 8,201,203 B2 * | 6/2012 | Vitito | 725/75 |
| 2006/0070102 A1 | 3/2006 | Vitito | |
| 2006/0146657 A1 * | 7/2006 | Laraia | 369/30.01 |
| 2006/0253878 A1 | 11/2006 | Davis | |
| 2007/0102973 A1 * | 5/2007 | Vitito | 297/217.3 |
| 2008/0157574 A1 * | 7/2008 | LaRussa | 297/217.3 |
| 2008/0185886 A1 * | 8/2008 | Li | 297/217.3 |
| 2009/0013357 A1 * | 1/2009 | Cassellia et al. | 725/75 |
| 2012/0086247 A1 * | 4/2012 | Liu | 297/217.3 |

* cited by examiner

*Primary Examiner* — Milton Nelson, Jr.

(74) *Attorney, Agent, or Firm* — Jason T. Daniel, Esq.; Daniel Law Offices, P.A.

(57) ABSTRACT

A vehicle media system for a seat of a vehicle is disclosed. The system includes a media unit mounted to a support structure within a headrest, a video monitor supported within the media unit, and a media source device coupled to the support structure at a horizontal angle with respect to the media unit to permit front loading access of the media source device by a vehicle occupant.

15 Claims, 10 Drawing Sheets

HEADREST MEDIA SYSTEM FOR A SEAT BACK OF A VEHICLE

TECHNICAL FIELD

This disclosure relates to a vehicle media system. More particularly, the disclosure relates to a media system integrating a video source and video monitor within the headrest of a vehicle.

BACKGROUND

The statements in this section merely provide background information related to the present disclosure and may not constitute prior art.

A vehicle headrest, typically provided in an automobile or airplane, having a vehicle-mounted support typically fixed in a seat back and a cushion against which the occupant of the seat can rest the back of his or her head is known. Headrests provide protection against whiplash by preventing the occupant's head from snapping too far back when rebounding after a front-end collision or simply moving back in a rear-end collision. Recently, media systems have been incorporated into backs of headrests, providing vehicle occupants the opportunity to view entertainment or educational video programs during vehicle operation.

Such media headrest systems are known to include optical media drives such as a digital video disc player or CD-ROM player. Access to the disc drive is provided via a slot or a moveable tray, positioned in or on a top, bottom, or a left or right side drive of the headrest. Accessing a disc drive from a top, bottom, or side position is inconvenient and typically necessitates protruding at least a portion of the drive from the headrest, offsetting a center-of-mass of the headrest, and exposing the drive to potential unintended impacts by vehicle occupants or objects moved in or out of a vehicle. Other known drive access configurations require an operator to pivot or remove a video monitor to access the drive. Installation and operation of such systems can be inconvenient. Additionally, such configurations require additional components to pivot, offset, or remove the video monitor. Thus, it would be advantageous to provide a front forward drive access enabling an operator to insert or eject a disc using a forward motion and for interfacing with an external media device, such as an iPod®, iPad® interface module, and iTouch®, in a front loading manner.

Typically, media headrest systems have been installed as aftermarket products where the seat back or head restraint, whether part of an adjustable head restraint unit or a molded bucket seat, is modified to accept the video display device. Unfortunately, existing media headrest systems are often secured poorly to the headrest and pose a risk for dislodging during a dynamic vehicle event, such as a vehicle collision, posing an additional risk to vehicle occupants. In many cases, glue and staples are used to secure mounting brackets to the headrest that receive the visual display unit. Additionally, media systems that concentrate components towards an outside of the headrest have a center-of-mass that contributes to undesirable torque forces during a dynamic vehicle event that may dislodge the media system from the headrest. Shifting a center-of-mass of the media system towards a center of the headrest and towards the seat back alleviates a significant amount of the undesirable torque forces, decreasing risk that the media system will dislodge during a dynamic vehicle event. Therefore, there is a need for embodiments of a media headrest system and method of mounting that securely attaches the media system to the headrest to reduce the risk that the system dislodges during vehicle operation.

A further difficulty with existing media headrest system designs is that they do not efficiently dissipate thermal energy generated by the media system. During operation, thermal energy generated by the media system can increase operating temperatures of associated components, damaging, deteriorating the components, and/or resulting in a thermal event such as a fire. Media systems that inhibit or ineffectively dissipate the generated thermal energy risk damaging the components of the media system rendering the media system inoperable or creating an unsafe volatile condition. Thus, there is a need for embodiments of a headrest media system to dissipate generated thermal energy during operation.

SUMMARY

A vehicle media system for a seat of a vehicle is disclosed. The system includes a media unit mounted to a support structure within a headrest, a video monitor supported within the media unit, and a media source device coupled to the support structure at a fixed oblique angle with respect to the media unit to permit operation and front forward access, i.e., front loading, of the media source device by a vehicle occupant.

Certain embodiments of the invention include a feature of a thermal dissipation system to dissipate heat generated by the media unit during operation within the headrest. In one embodiment, a hollow internal pathway compartmented design utilizes an internal portion of the headrest to vent heated air through a bottom area of the headrest. A fan may be used to direct headed air through the pathway and out of the headrest. In one embodiment, the media source device may be thermally coupling to the support structure to further dissipate heat by transferring the generated heat to the support structure. A layer of thermally conductive material may be disposed between the media source device and the support structure to facilitate heat transfer from the media source device. The support structure may be shaped or provided with structures to increase its surface area in order to facilitate dissipating heat from the media source device.

Certain embodiments of the invention include a feature of directly coupling the support structure to a seat bar. The support structure may be directly coupled to the media unit to reduce unintended dislodging of the media unit from the headrest. The center-of-mass may be located close to a seatback associated with the headrest.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1A:
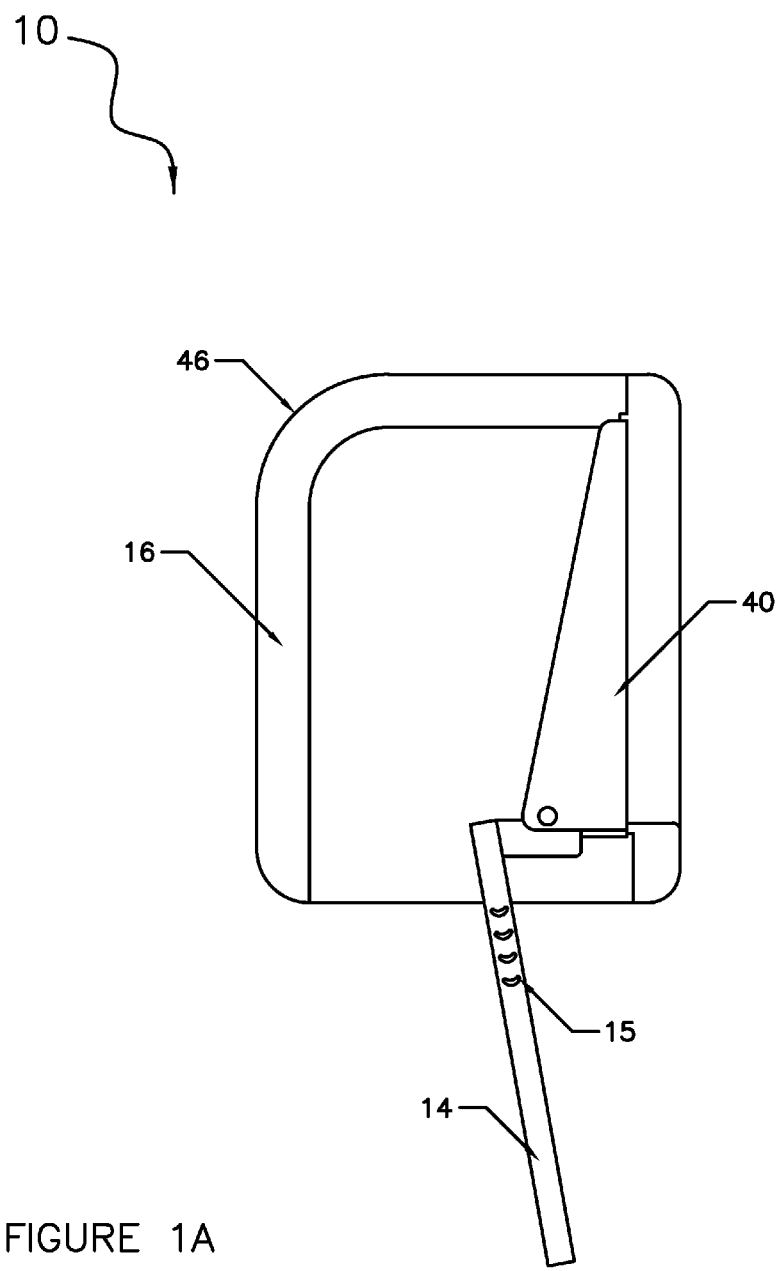
FIG. 1A is a side view of an exemplary headrest, in accordance with an embodiment of the disclosure.
Figure 1B:
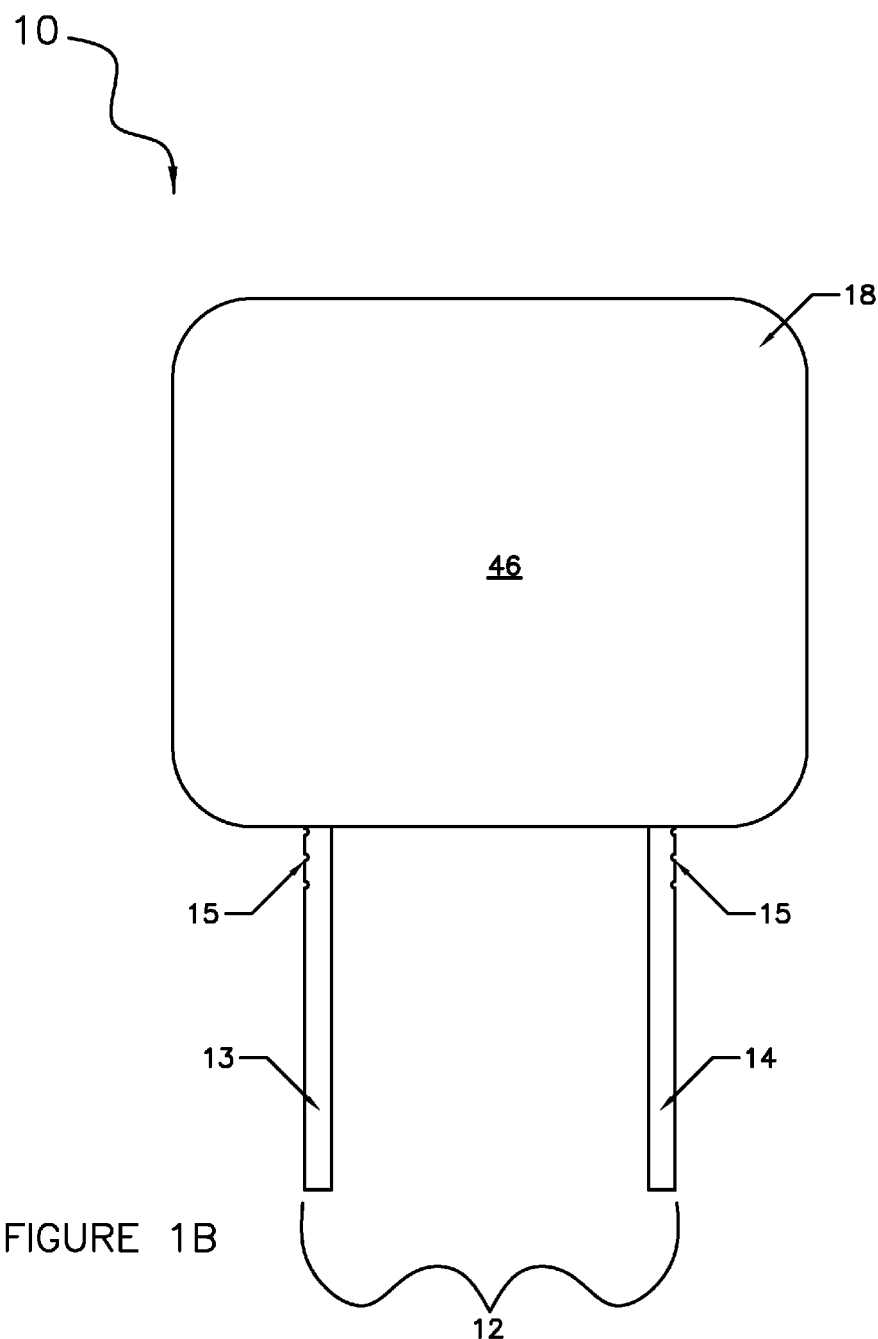
FIG. 1B is a front view of the exemplary headrest, in accordance with an embodiment of the disclosure.

Referring now to the drawings, wherein the showings are for the purpose of illustrating certain exemplary embodiments only and not for the purpose of limiting the same, FIGS. 1A and 1B illustrate an exemplary embodiment of a headrest 10. The headrest 10 is mountable in a seat back of a vehicle. FIG. 1A shows a side view of the headrest 10, while FIG. 1B shows a front view of the headrest 10. As FIGS. 1A and 1B show, the headrest has a seat bar 12 including a first rod 13 and a second rod 14 for insertion into a seatback of a vehicular seat. Sawtooth notches 15 on the confronting edges of the first and second rods 13 and 14 allow the height of the headrest 10 above the seat back to be adjusted according to operator preference. The headrest 10 can be arranged to pivot limitedly about a horizontal axis. The headrest 10 can include a main body 10a that is covered with a fabric cover 18 having a front face 46 to support a back of a head of a person sitting in the vehicular seat. Preferably, the fabric cover 18 is configured to hold cushioning material 16 such as expanded polypropylene foam within the headrest 10.

Figure 2:
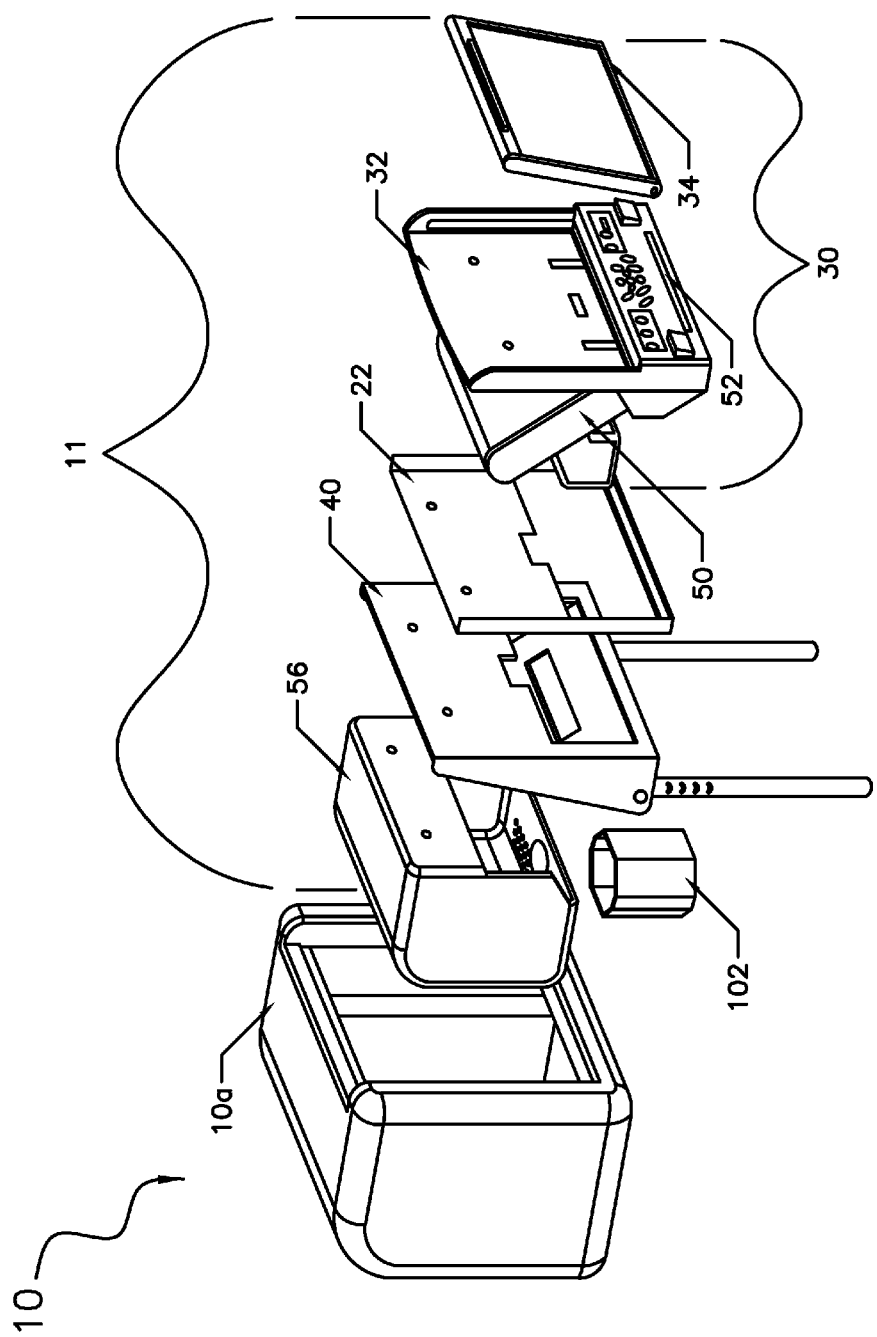
FIG. 2 is an exploded view of a headrest media system, in accordance with an embodiment of the disclosure.

FIG. 2 is an exploded view of a headrest media system 11 mountable in the headrest 10. The headrest media system 11 includes an inner housing 56, a vented cooling shaft 102, a support structure 40, a housing 22, a media unit 32, and a video monitor 34. As described herein below, the media unit 32, the video monitor 34, and a media source device 50 form a media system 30. The inner housing 56 is configured to mount within the headrest 10 and receive the support structure 40 and the media unit 32.

Figure 3A:
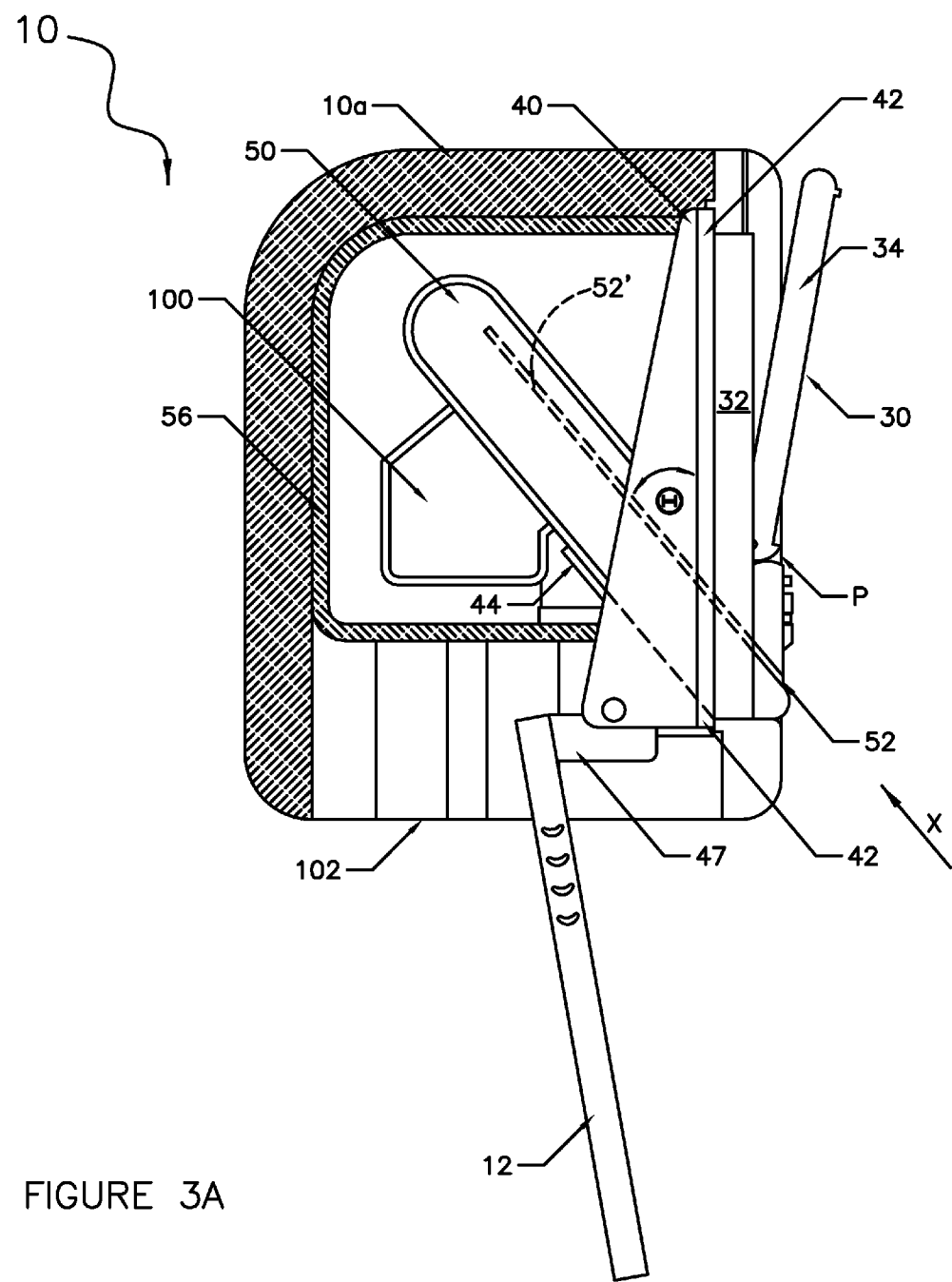
FIG. 3A is a sectional, side view of a headrest and support structure, in accordance with an embodiment of the disclosure.

FIG. 3A shows a sectional, side view of a headrest 10 and the media system 30, wherein the fabric cover 18 and the inner housing 56 are partially removed for ease of illustration, in accordance with an embodiment of the disclosure. The headrest 10 includes a cavity of predetermined shape and size to contain the inner housing 56 and at least partially contain the media unit 32. The cavity is preferably shaped to reduce a profile of the media unit 32 when the media system 30 is not in use. In one embodiment, the profile is additionally reduced by mounting the video monitor's control module separately from the media unit 32, leaving a relatively thin screen. The support structure 40 secures the media system 30 to the headrest 10 and secures the headrest 10 to the seat back of the vehicle via the seat bar 12, as described above. As shown in FIG. 3A, the support structure 40 can preferably include the seat bar 12 connected to a horizontal support plate 47 that is also connected to a vertical support plate 42.

The media system 30 includes the media unit 32, the video monitor 34, and the media source device 50. A video monitor control module may be included in certain embodiments. The video monitor 34 may be any type of known visual display unit such as an LCD type display, plasma, an organic LED, or electro-luminescent display. The media source device 50 is communicatively connected to the media unit 32 using one of multiple known communication means such as an HDMI cable or wireless radio communications to supply audio and/or video signals. Power, ground, and additional audio/video inputs and outputs may be connected to or from the media unit 32.

Figure 3B:
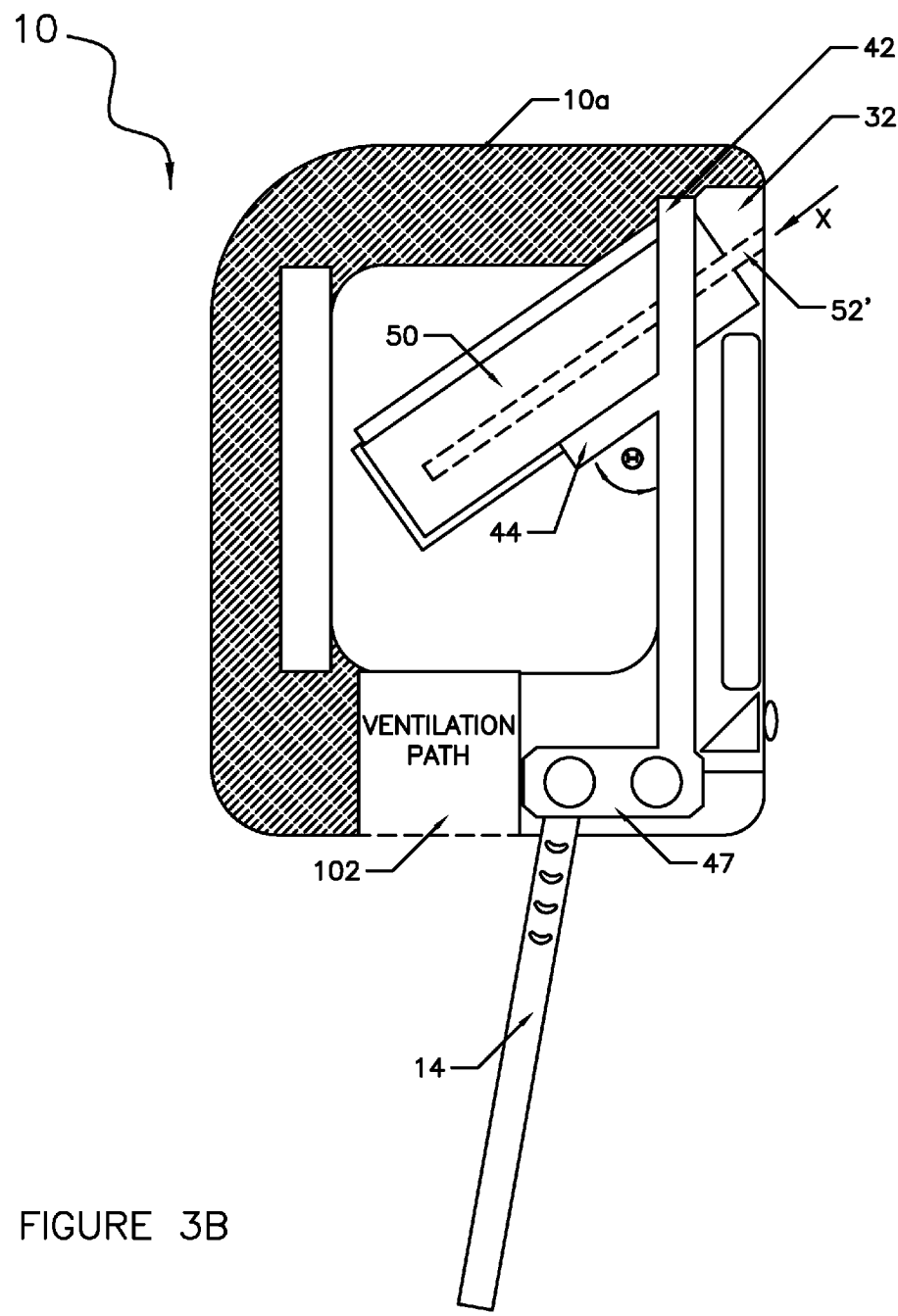
FIG. 3B is a sectional, side view of an alternative embodiment of a support structure within the headrest, in accordance with an embodiment of the disclosure.

The media source device 50 can include any number of known content sources including, for example, an optical media drive such as a digital video disc (DVD) player or Blu-Ray® player, a video game counsel or other set-top-box, audio device, a CD-ROM player, a television tuner, a radio tuner, a wireless receiver, an MP3 player, a digital video recorder (DVR), a device for playing media supplied from a portable storage device (e.g., a portable hard drive, memory cards, flash memory, and other solid-state memory) and/or a device for playing media supplied from a portable media player, for example, an audio or video device such as an iPod®, iPad®, and iTouch®. As shown in FIG. 3B, the media source device 50 according to one embodiment can include an optical media drive used to supply visual information to the media unit 32 for display to a user.

In embodiments of the media system 30 wherein the media source device 50 is configured to receive and utilize media stored in an external device, the media source device 50 can be arranged on the support system 40 at virtually any area within the headrest 10. The media source device 50 may be coupled directly to the vertical support plate 42 in such an embodiment, as illustrated in FIG. 3B. In one embodiment, the media source device 50 may be removable from the media system 30. In this way, an operator may easily upgrade the device 50 or insert an alternate media source device such as the universal docking device for interfacing with an external media device. In one embodiment, media source device 50 may be configured as a universal docking device to permit front loading of an external device via a front face of the media system 30. In this way, an operator may physically insert an external media device such as an IPOD®, for example, into the docking device from a front forward manner, i.e., a direction X as substantially shown in FIGS. 3A and 3B.

In an embodiment of the media source device 50 configured to accept a universal-serial bus (USB) configured external device, the media source device 50 includes a USB connection port configured to receive the external device in a front forward manner. The USB connection port may be included on the media unit 32 and communicatively connected to the media source device 50, in one embodiment. The disclosure herein can be applied to various external devices and connection means adapted on the media source device 50 to receive and access the external device and is therefore not intended to be limited to the particular embodiments disclosed herein.

In embodiments of the media system 30 wherein the media source device 50 is configured to receive and utilize an optical media disc such as a DVD, a particular angle θ between the media source device 50 and the vertical support plate 42 is selected to enable front loading access of the optical media disc by a vehicle occupant. The angle θ associated with the media source device 50 and the vertical support plate 42 may be substantially the same as an angle between the vertical support plate 42 and the angled support plate 44. The angled support plate 44 is preferably positioned at 35 degrees from the vertical support plate 42, although the disclosure herein contemplates positioning the angled support plate 44 within a range of between 15-degrees and 165-degrees, for example, to accommodate front loading access regardless of the vertical position of the media source device 50. As will be described below, the media source device 50 can also include an integrated slot through which a DVD or other optical media disc can be inserted, or can include a moveable tray configured to extend outward for placement of the disc. To this end, the media source device 50 can be coupled to the angled support plate 44 such that the slot is accessible from a direction X as shown in FIGS. 3A and 3B, (i.e., front loading access). Front loading access enables an operator of the media headrest system 30 to insert a disc using a forward motion.

In embodiments wherein the media source device 50 is angled within the headrest 10 such as shown in FIG. 3A, a guide slot 52 is preferably included on the media unit 32 to guide insertion of an optical media disc into the media source device 50 that is configured to receive and process the optical media disc.

FIG. 3B shows a sectional, side view of an alternative embodiment of the support structure 40 configured for front loading access of the media source device 50. As FIG. 3B shows, the media source device 50 is arranged on the support system 40 at a particular angle θ to enable front loading access of the media source device 50 by a vehicle occupant. As described herein above, the angled support plate 44 may be attached to the vertical support plate 42 at any angle between 15-degrees and 165-degrees for embodiments of the media source device 50 receiving external media modules such as optical media discs. For embodiments of the media source device 50 receiving media content via external electrical connection, e.g., USB, or via wireless communications, the media source device 50 may be positioned at any area within the headrest 10 and attached to the support system 40 at any angle or arrangement.

Figure 4:
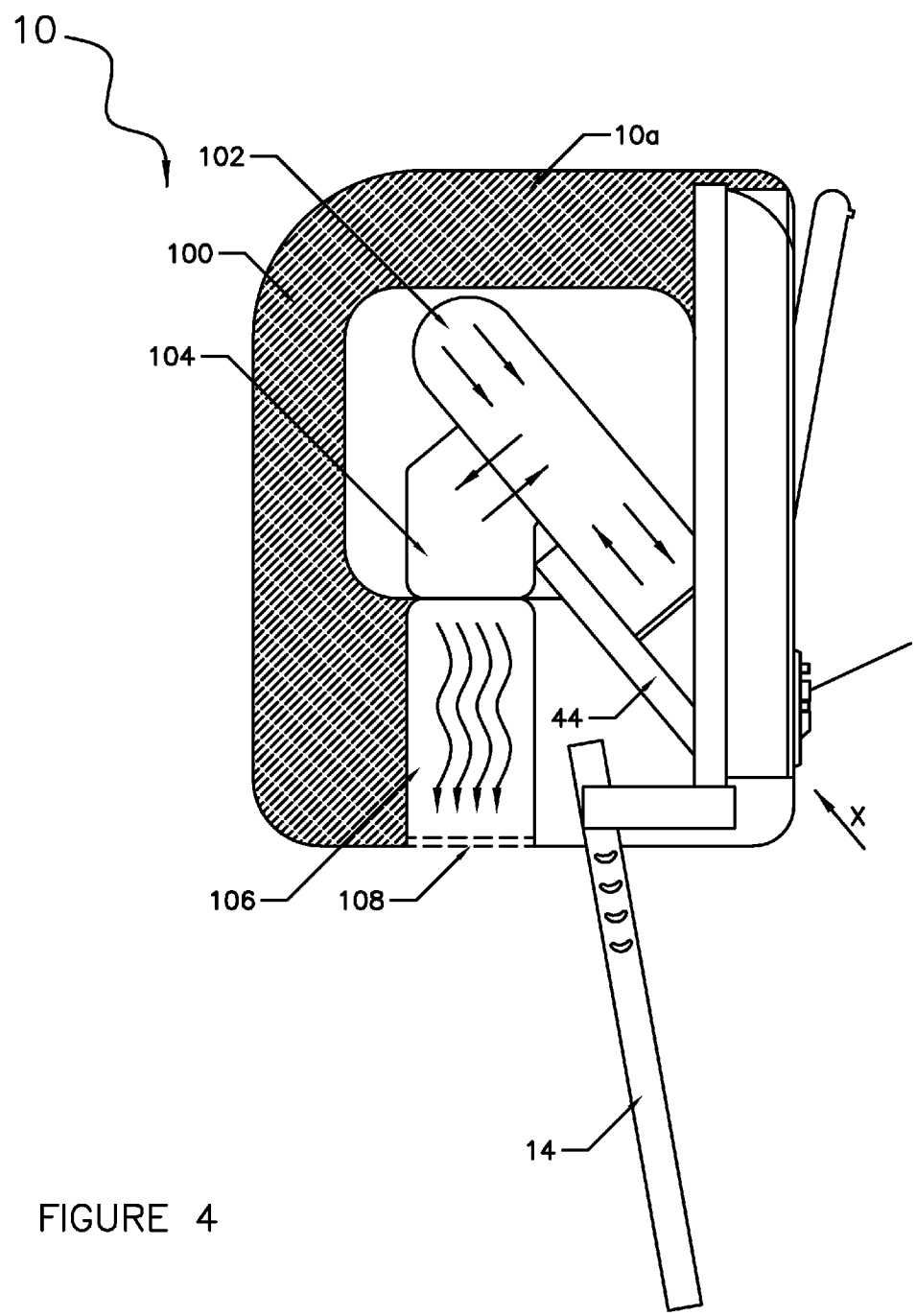
FIG. 4 shows a sectional, side view of a thermal dissipation system within the headrest, in accordance with an embodiment of the disclosure.

FIG. 4 shows a sectional, side view of a thermal dissipation system 100 within the headrest 10. The thermal dissipation system 100 can include one or more hollow tubes 102, 104, and/or 106 each configured to direct heated air from the headrest 10. The thermal dissipation system 100 is configured to dissipate thermal energy generated by the media source device 50 and is preferably configured to direct thermal energy away from the device by directing the heat down the cooling shaft 108 in the headrest 10 until it is removed into the surrounding environment. In one embodiment, the thermal dissipation system 100 can include an optional cooling fan (not illustrated) located at or near the cooling shaft 108 in order to physically pull heat from the system 100. Cooling fans of this type being well known in the art, no further description will be provided. The cooling shaft 108 may be supported by a housing and connected to the support structure. The thermal dissipation system 100 may be connected to the media source device 50 or the angled support plate 44. In one embodiment, the thermal dissipation system 100 is thermally coupled to the angled support plate 44 and includes shaped structures such as cooling fins to increase its surface area in order to facilitate dissipating heat from the media source device 50.

The thermal dissipation system 100 is preferably aided by thermally coupled the media source device 50 to the angled support plate 44 to enable a thermal energy transfer from the media source device 50 to the angled support plate 44. In this way, the angled support plate 44 is used as a heat sink to dissipate heat generated by the media source device 50. In one embodiment, the media source device 50 can be adapted to have the bottom surface thereof placed in thermal contact with the angled support plate 44. Heat generated by the media source device 50 can then be transferred to the angled support plate 44 and dissipated preferably to one or more of the hollow tubes or the cooling shaft described above. In one embodiment, the angled support plate 44 may be shaped or provided with structures to increase its surface area in order to facilitate dissipating heat from the media source device 50. Furthermore, a layer of thermally conductive material may be disposed between the media source device 50 and the angled support plate 44 to facilitate heat transfer to the angled support plate 44. In one embodiment, a thermally conductive layer of material couples a surface of the media source device 50 with a surface of the angled support plate 44. Although the angled support plate 44 and the media source device 50 are thermally coupled as described herein above, various other approaches for coupling the angled support plate 44 with the media source device 50 are contemplated by the disclosure and the disclosure is therefore not intended to be limited to thermal coupling.

Figure 5:
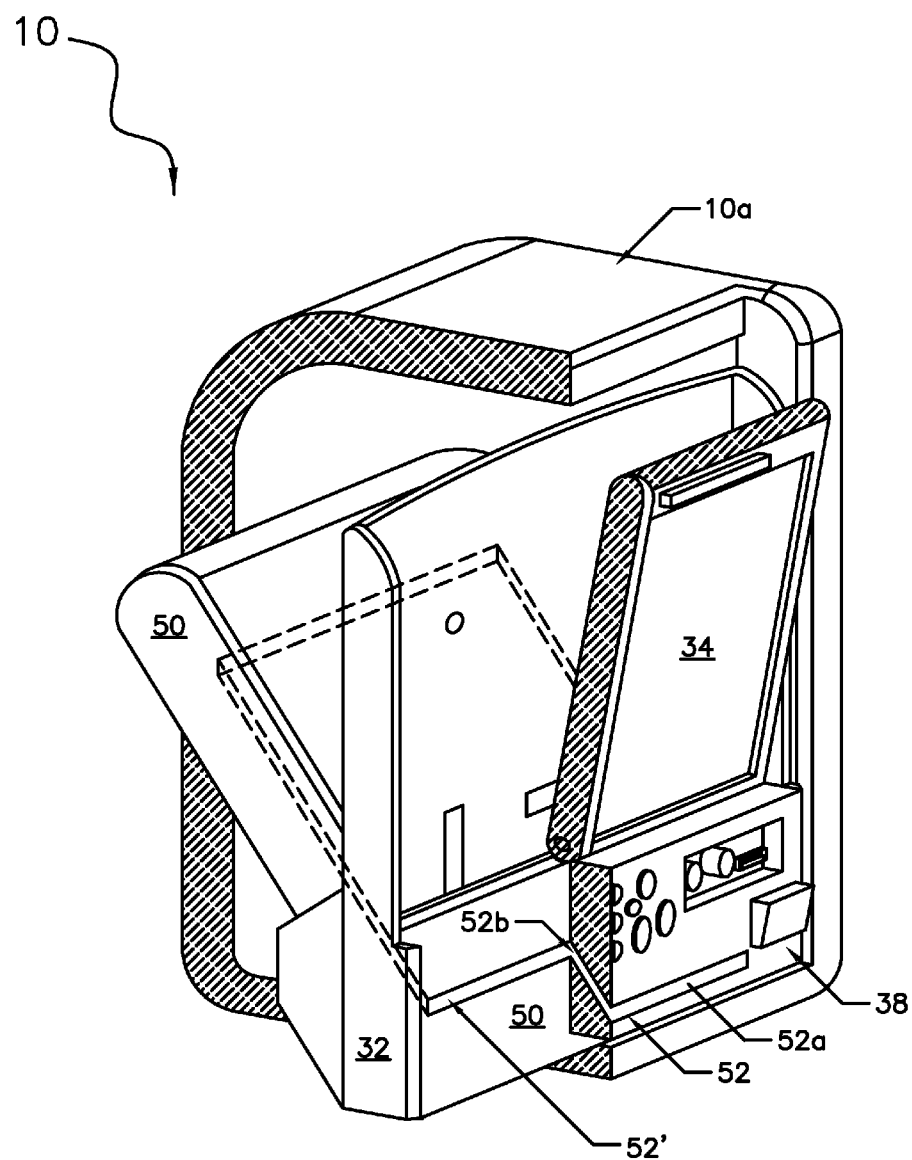
FIG. 5 shows an exemplary guide slot, in accordance with an embodiment of the disclosure.

FIG. 5 shows an exemplary guide slot 52 having a front end 52a and a back end 52b, for guiding insertion of an optical media disc or electronic media device into the media source device 50 of the media system 30. The guide slot 52 restricts an angle at which an optical media disc or electronic media device may be inserted into the media source device 50 to aid a proper loading sequence. The guide slot 52 is an opening that is sized to receive an optical media disc or electronic media device. As shown, the back end of the guide slot 52b abuts an optical media slot 52' used by the media source device 50. The guide slot 52 is preferably located on the front face housing 38 of the media unit 32. The guide slot 52 is preferably a molded part of the housing 38.

Figure 6:
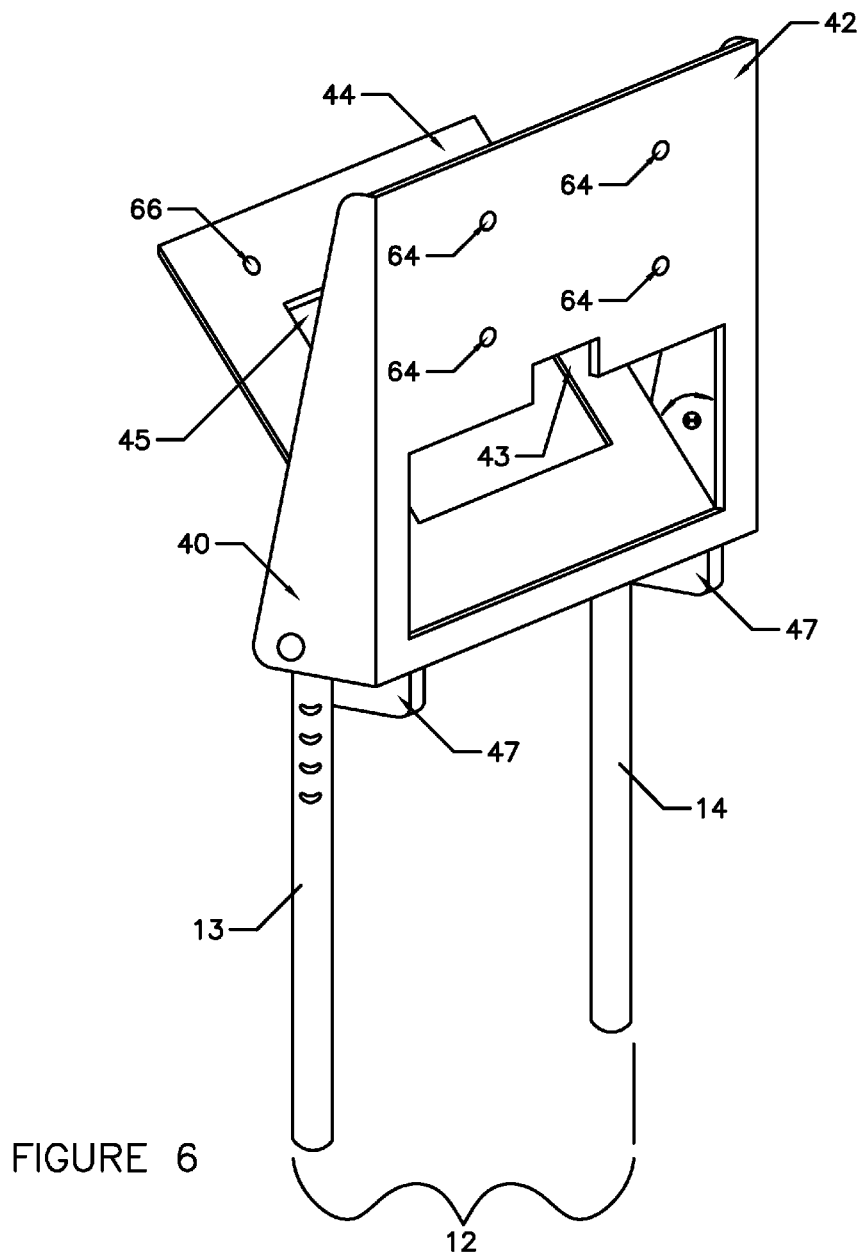
FIG. 6 shows a three-dimensional view of a support structure for the headrest, in accordance with an embodiment of the disclosure.

FIG. 6 shows a three-dimensional view of an embodiment of the support structure 40 of the headrest 10 and the media system 30. As FIG. 6 shows, the support structure 40 can include a vertical support plate 42, an angled support plate 44, a horizontal support plate 47, and a seat bar 12 that includes the first rod 13 and the second rod 14. An opening 43 is included to access the media source device 50, which can be connected to the angled support plate 44, as described above. The horizontal support plate 47 is connected to the vertical support plate 42; and the angled support plate 44 is connected to the vertical support plate 42 at an oblique angle θ. The seat bar 12, the horizontal support plate 47, the vertical support plate 42, and the angled support plate 44 are shown in FIG. 6 as single elements. Such illustration is for ease of description and it should be recognized that the seat bar 12, the horizontal support plate 47, the vertical support plate 42, and the angled support plate 44 may be one continuous component or multiple connected components.

The vertical support plate 42 and the angled support plate 44 are preferably of a thickness suitable to mount and support components of the media system 30. In one embodiment, the support structure 40 is made of a steel alloy, but may be made of any material suitable to support the headrest 10 and the media system 30. The angled support plate 44 is preferably positioned at 35 degrees from the vertical support plate 42, although the disclosure herein contemplates positioning the angled support plate 44 within between 15-degrees and 165-degrees.

Figure 7:
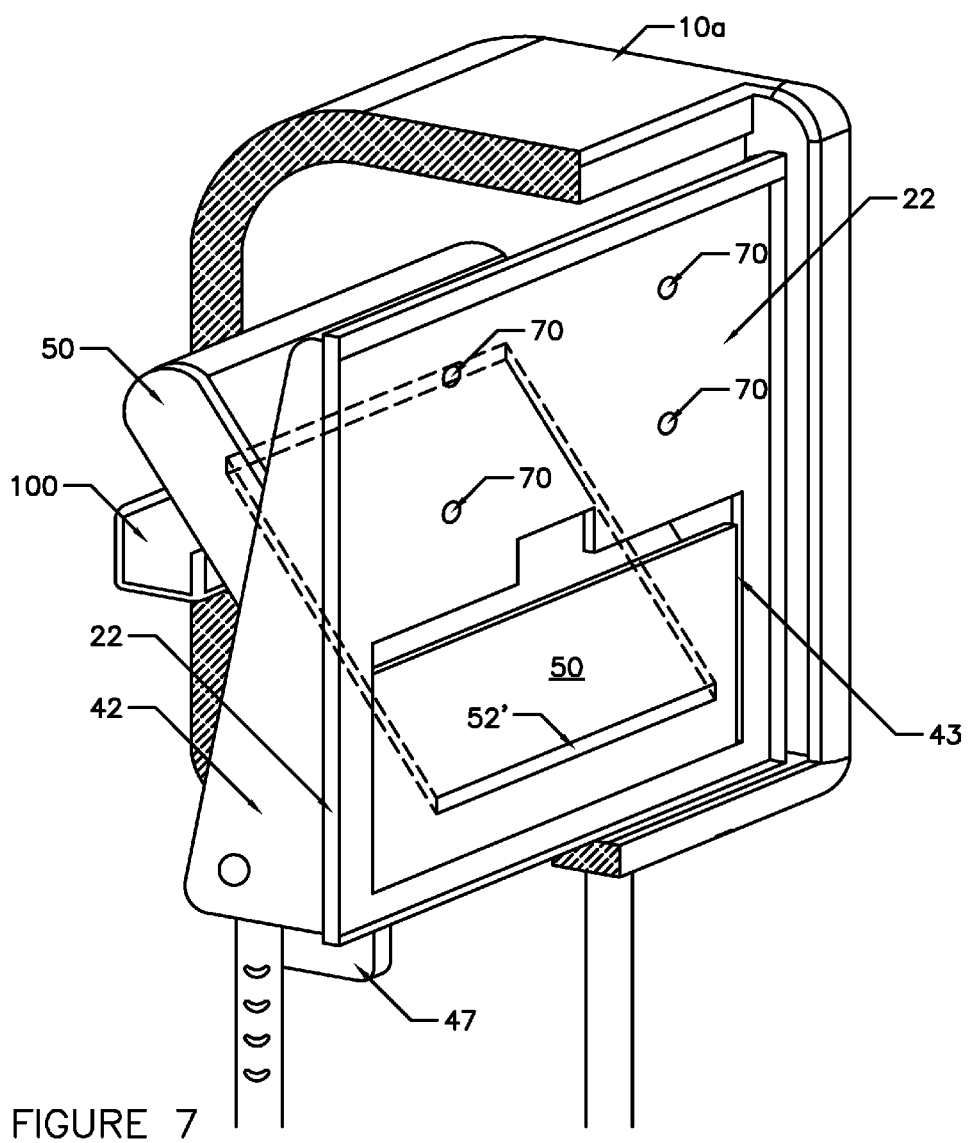
FIG. 7 shows a housing configured to receive a media unit, in accordance with an embodiment of the disclosure.

The vertical support plate 42 may include a plurality of mounting holes 64 for mounting the housing 22 as shown in FIG. 7. Likewise, the angled support plate 44 may include a plurality of mounting holes 66 for mounting the media source device 50. Additionally, the angled support plate 44 may include an opening 45 for fitting a portion of the media source device 50 through the angled support plate 44. Such a feature can allow the system 11 to utilize a significant portion of free space within the headrest which has heretofore been vacant. Alternatively, this space 45 can be occupied by a cooling fan (described above) for dissipating thermal energy generated by the media source device 50.

In one embodiment, the support structure 40 is configured to align a center-of-mass of the media system 30 with a substantially geometric center of the headrest 10. For example, the angled support plate 44 is configured, in one embodiment, to include additional mass to move the center-of-mass towards a geometric center of the headrest 10.

FIG. 7 shows an exemplary housing 22 for receiving the media unit 32. The housing 22 includes a plurality of recesses 70 for receiving fixing devices, such as screws for mounting the housing 22 to the support structure 40. The housing 22 is preferably secured to the vertical support plate 42 using a nut and bolt assembly, tapered screws, weld, or any other known secure fastening means. The housing 22 also includes an opening 43 through which wires can be fed, such as described herein above. For example, the video signal from the media source device 50 to the video monitor 34 may be supplied via the wired connection. In one embodiment, the housing 22 includes flexible members configured to engage tabs on the media unit 32 that enables the media unit 32 to be readily snapped into and/or removed from the housing 22.

In one embodiment, the video monitor 34 is pivotably coupled to the media unit 32 using one of more known pivotal attachment means such as a hinge. The hinge may be any one of number of known hinge devices configured to permit vertical and/or horizontal pivot motion of the video monitor 34 so as to accommodate viewing thereof by one or more rear-seat passengers. In one embodiment, a hinge is directly attached to the vertical support plate 42 through the housing 22 and the media unit 32. The hinge may then be attached to the media unit 32 to enable pivotal movement of the video monitor 34. Alternatively or additionally, the hinge may be secured to the housing 22 through an opening on the media unit 32. Multiple pivot points on the video monitor 34 are contemplated by the disclosure herein including positions associated with a bottom vertical half of the video monitor 34. As illustrated in FIG. 3A, a pivot point P associated with a bottom half of the video monitor 34 enables a downward tilt about a first, horizontal axis. The pivot point may be selected or adjusted in different embodiments based upon orientation of the headrest 10 mounted in a seat, and/or the orientation effected by a particular seat configuration. In one embodiment, the screen also is pivotal about a second axis transverse to the first axis. The disclosure herein can be applied to various attachment means between the video monitor 34 and the media unit 32 and is therefore not intended to be limited thereby.

Figure 8:
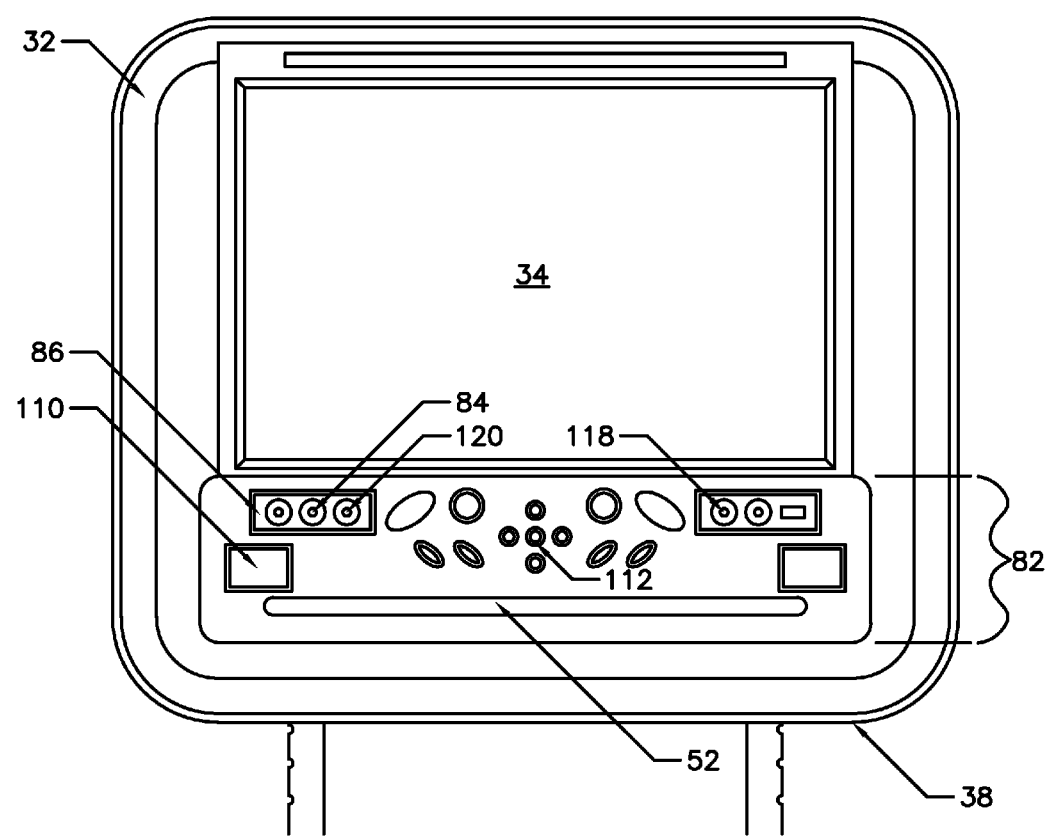
FIG. 8 shows an exemplary media unit, in accordance with an embodiment of the disclosure.

FIG. 8 shows the front face housing 38 of an exemplary media unit 32 having a connected video monitor 34, and a media control interface 82. The media control interface 82 includes a plurality of media control buttons configured to control operation of the media system 30 including control of the video monitor 34 and the media source device 50. Exemplary control buttons 112 that may be included in an embodiment of the disclosure can include, a power button, a screen mode button for controlling aspect ratio, play and stop buttons for controlling play of a video program and a source button for controlling the source of a program (e.g., DVD or auxiliary input). A headphone jack 84 can also be positioned on the front face of the media unit 32. In one embodiment, the media unit 32 can also include an infrared transmitter and receiver 110 for transmitting, for example, wireless audio signals to wireless headphones, and for receiving remote control signals. In one embodiment, a USB connection port 86, communicatively connected to the media source device 50, is included on the media control interface 82.

The media control interface 82 additionally includes the guide slot 52 described above for front loading access of a media storage module, such as an optical media disc, to an embodiment of the media source device 50 adapted to receive and access the media storage module. RCA Jacks 118 may be incorporated into the media unit 32, in one embodiment, for receiving and transmitting audio and video signals. An auxiliary input jack 120 may be included to receive communication signals from an external audio/video media device. The disclosure herein can be applied to various embodiments of the media unit 32 including various configurations of media control buttons, and various embodiments of the media control interface 82 and is therefore not intended to be limited thereby.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A vehicle headrest media system, comprising:
   a unitary support structure comprising a vertical support plate, an angled support plate and a seat bar that includes first and second rods that are configured to secure the headrest media system to a vehicle seatback;
   a media system that includes
      a media unit that is coupled to the vertical support plate, said media unit including a video monitor that is positioned along a front facing side thereof, and
      a media source device that is coupled to the angled support plate at a fixed oblique angle with respect to the media unit for front loading access and operation of the media source device; and
   a headrest main body for receiving each of the support structure and the media system,
   said support structure positioning a center-of-mass of the media system along a geometric center of the headrest main body.

2. The vehicle headrest media system of claim 1, wherein the media source device is an optical media drive.

3. The vehicle headrest media system of claim 1, further comprising:

a thermal dissipation system positioned within the headrest main body, said thermal dissipation system configured to dissipate thermal energy from the media source device.

4. The vehicle headrest media system of claim 1, wherein the fixed oblique angle is between approximately 15 and 45 degrees.

5. The vehicle headrest media system of claim 1, wherein front loading access comprises insertion of a media object at an oblique angle between substantially 15 and 45 degrees with respect to a perpendicular axis intersecting a front face of the media unit.

6. The vehicle headrest media system of claim 1, further comprising:
   an inner housing that is disposed between the headrest main body and the support structure, and
   wherein the media unit is coupled to the vertical support plate via a housing.

7. The vehicle headrest media system of claim 1, wherein the vertical support plate includes an opening sized to permit front loading access to the media source device and wherein the angled support plate is disposed at an oblique angle between approximately 15 and 45 degrees with respect to the vertical support plate.

8. The vehicle headrest media system of claim 7, wherein the media source device is positioned within the opening of the vertical support plate.

9. The vehicle headrest media system of claim 1, wherein the media source device is thermally coupled to the support structure.

10. The vehicle headrest media system of claim 1, wherein the media unit includes at least one of a USB connection port, an infrared camera, a focused light source, and a microphone.

11. The vehicle headrest media system of claim 1, wherein the support structure is secured within the headrest main body at a time of manufacture.

12. A vehicle headrest, comprising:
   a headrest main body having a front, back, top and bottom side defining an interior space;
   a support structure comprising a vertical support plate, an angled support plate and a horizontal support plate that are disposed within the interior space of the headrest main body, and a seat bar that includes first and second rods extending downward from the bottom side of the headrest main body;
   a media system that includes
      a media unit that is coupled to the vertical support plate, said media unit including a video monitor that is positioned along a front facing side thereof, and
      a media source device that is coupled to the angled support plate at a fixed oblique angle with respect to the media unit for front loading access and operation of the media source device,
      said support structure positioning a center-of-mass of the media system at a geometric center of the headrest main body; and
   a thermal dissipation unit that includes an elongated tubular member having a first end that is in communication with the media source device, and a second end having an opening that is generally flush with the bottom side of the headrest main body,
   said thermal dissipation unit being configured to draw heat away from the media source device.

13. The vehicle headrest of claim 12, wherein the media source device is also thermally coupled to the support structure.

14. The vehicle headrest of claim 12, wherein the media source device is a solid state device.

15. The vehicle headrest of claim 12, wherein the media source device is configured to receive and utilize media stored in an external device.

\* \* \* \* \*